Aug. 2, 1955

J. M. UNK ET AL 2,714,631

SWITCHING DEVICE FOR USE IN AUTOMATIC TELEPHONE SYSTEM OR A SIMILAR SYSTEM

Filed Nov. 29, 1950

4 Sheets-Sheet 1.

INVENTORS
JACOB MARINUS UNK
NICOLAAS SCHEFFER
REINHARD CORNELIS GREVE
BY Fred M Vogel
AGENT Aug. 2, 1955

J. M. UNK ET AL 2,714,631

SWITCHING DEVICE FOR USE IN AUTOMATIC TELEPHONE SYSTEM OR A SIMILAR SYSTEM

Filed Nov. 29, 1950

4 Sheets-Sheet 2

INVENTORS

JACOB MARINUS UNK
NICOLAAS SCHEFFER
REINHARD CORNELIS GREVE

BY Fred M Vogel

AGENT

INVENTORS
JACOB MARINUS UNK
NICOLAAS SCHEFFER
REINHARD CORNELIS GREVE
BY Fred M Vogel
AGENT Aug. 2, 1955 J. M. UNK ET AL 2,714,631

SWITCHING DEVICE FOR USE IN AUTOMATIC TELEPHONE SYSTEM OR A SIMILAR SYSTEM

Filed Nov. 29, 1950 4 Sheets-Sheet 4

INVENTORS
JACOB MARINUS UNK
NICOLAAS SCHEFFER
REINHARD CORNELIS GREVE
BY Fred M Vogel
AGENT

United States Patent Office 2,714,631

Patented Aug. 2, 1955

2,714,631

SWITCHING DEVICE FOR USE IN AUTOMATIC TELEPHONE SYSTEM OR A SIMILAR SYSTEM

Jacob Marinus Unk, Nicolaas Scheffer, and Reinhard Cornelis Greve, Hilversum, Netherlands, assignors to Hartford National Bank and Trust Company, Hartford, Conn., as trustee Application November 29, 1950, Serial No. 198,062

Claims priority, application Netherlands December 1, 1949

10 Claims. (Cl. 179—27.5)

The invention relates to a switching device for use in automatic telephone systems or similar systems.

A switching device in accordance with the invention is arranged in a manner such that the switching operations performed thereby are variable according to circumstances by the exchange of a particular component. This renders the device particularly suitable for all sorts of purposes. Thus, for example, it may be used to convert a call signal formed by a series of current pulses and received in an intermediate station into a series of current pulses with different numbers, or into characteristic combinations of electric quantities. This will be referred to hereinafter as the translation of chosen digits. Such translation makes it possible to lead connections to a definite point along entirely different paths.

The use of the switching device according to the invention furthermore enables the giving of particular indications, which for example, relate to the trunk zone which includes the connection asked for. It may also be used to record temporarily a called number.

The use of switching devices according to the invention improves inspection of a telephone exchange and simplifies its circuit due to a saving of many relays.

The switching device according to the invention has, in common with selector switches of conventional construction, a carriage which is movable as a whole and is provided with one or more wipers, which are associated with a contact bank.

Many known selector switches comprise wipers which form part of the mechanism moving the carriage into the desired position and other wipers which establish connections for telephone currents. Wipers of the latter category may be in evidence in the switching device according to the invention, but, in general, will not be required in this device, nor will there be required that part of the contact bank to which the loop wires are connected in known selector switches. In the carriage of the switching device according to the invention the telephone current wipers are replaced by a set of exchangeable members. The members are of different profile. They are therefore comparable to keys and accordingly will be referred as such hereinafter.

The keys are arranged such that in any operative position of the carriage one of them invariably occupies a particular position so as to be adapted to co-operate with a switching device. Since this key is moved into the position referred to by selecting a number, it will be referred to as the selected key.

The keys are preferably shaped in the form of flat strips which are arranged such that, when the carriage moves, they move at right angles to their plane. This enables a compact assembly. With a rotary carriage such strips are arranged in a manner similar to the collector lamellae of an electric motor. In a carriage performing a rectilinear movement they are arranged side by side in a row in the direction of movement of the slide.

The switching device comprises a number of switches, which are operated by movable tags, whether a particular switch is changed over or not, on the associated tag becoming operative, depends upon the selected key. The operating tags are arranged in a row. Upon being moved from their position of rest, they tend to contact with the selected key. Those tags which are opposite a depression in the surface of the selected key are moved farther than the others, which are arrested by an elevated part of the key surface.

Thus, some of the tags fall more deeply than the others and the switches are coupled with their operating tags such that only the switches associated with the former tags or with the latter tags are changed over as a result of the movement of the tags.

Owing to the disparity in the profiles of the various keys, different combinations of changed-over switches and switches not changed over are obtained in each instance. If the tag system is, for example, five-fold and if the surface of each key comprises two notches, ten different combinations are obtainable. By extension of the number of tags more combinations are made possible.

Each of these combinations can be used to give a definite command or a definite indication. To cite an example, it permits of controlling a multipolar switch which serves to cause the emission of a series of current pulses by which the further course of the connection is determined. The manner in which an incoming signal is translated with the use of the switching device according to the invention, can be modified at all times by insertion of a different key into the carriage.

After this explanation of the principles underlying the device according to the invention, several structural embodiments are disclosed hereinafter with reference to the diagrammatical drawing, in which.

Figure 5:
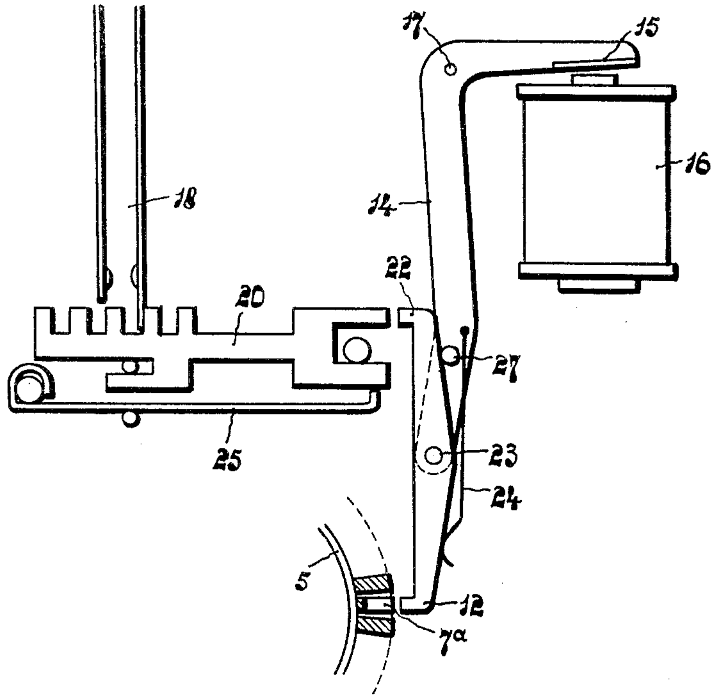

Fig. 5 relates to a modified form of construction of the switching device.

Figure 1:
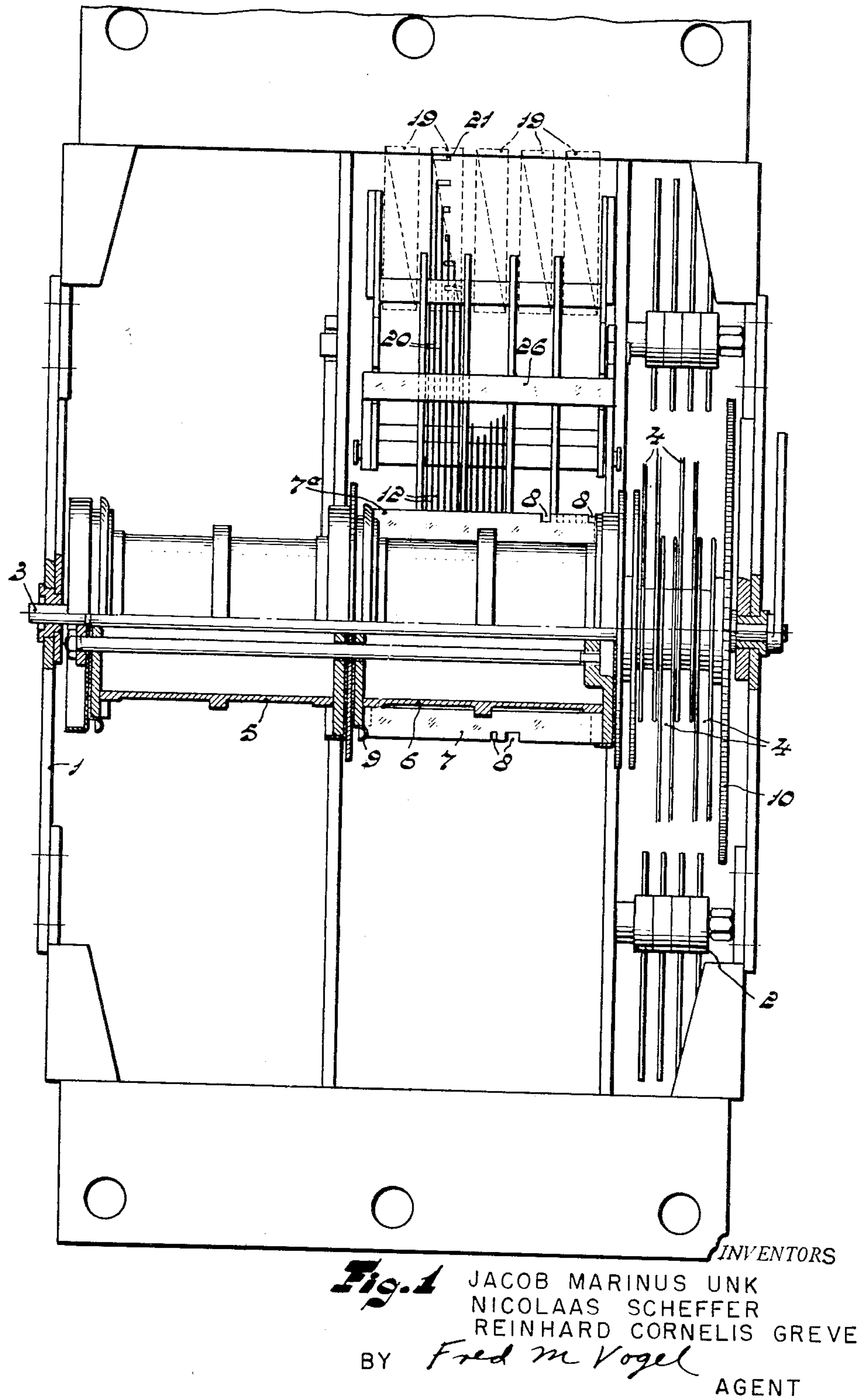
Fig. 1 shows one embodiment of a switching device according to the invention, comprising a rotary carriage, a cross-sectional view being taken on the axis of the carriage.
Figure 2:
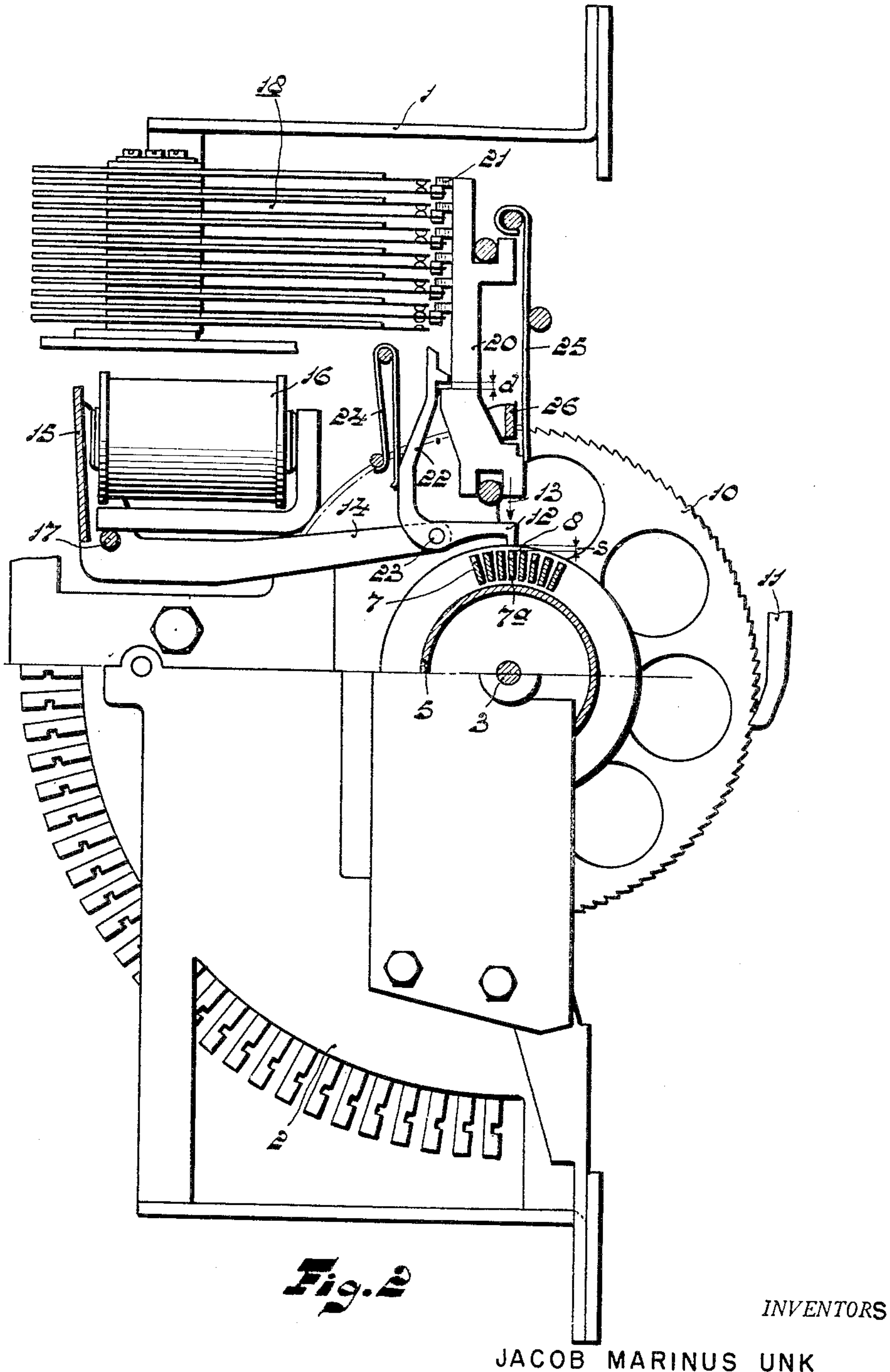
Fig. 2 shows the same device, viewed in the direction of the axis, some components being partially omitted to show the components lying behind.

Referring now to Figs. 1 and 2, the stationary part comprises primarily a frame work 1, a contact bank 2 and a switching device which will be described more fully hereinafter. The carriage has a shaft 3 journalled in the frame work 2. This shaft supports a restricted number of wipers 4, of which the brushes (not shown) wipe over the contact bank when the carriage rotates. These wipers may be used for the establishment of voltage interconnections and will, in general, not be required for conducting telephone currents. Also seated on the shaft are two drums 5 and 6, each of which supports a number of strips 7. These strips constitute the keys.

The device may have a single key drum, but for some purposes it is desirable to provide two or more key drums.

Formed in the outer edges of the keys are notches 8 which in one key occupy other areas than in the other key and may be different in number.

The keys fit at the top and at the bottom in slots in the flanges of the drums and are held by a spring 9. They can be readily removed and replaced by others.

The manner in which the carriage is driven is irrelevant to the scope of the invention. Selector switches for automatic telephone systems are known, which are driven by a continuously rotating shaft, with which they are coupled occasionally; others are moved stepwise by means of a self-interrupting magnet. There is in addition a drive by means of an electrical or mechanical escapement. All these methods of driving and even combinations thereof are suitable for use in the switching device according to the invention. In the drawing the driving means are omitted. It is assumed that the drive is effected by a continuously rotating shaft.

The ratchet wheel 10, which is firmly seated on the shaft, serves to stop the carriage. It cooperates with a magnetically actuated detent, a part 11 of which is shown.

The switching device, which is incorporated in the stationary part, comprises a number of tags 12, movable in the direction of the arrow 13 in Fig. 2. What number this must be depends on the use which is required to be made of the device. In the embodiment selected by way of example, thirty tags are arranged in five groups of six. They lie under one another in the direction of the axis, so that their projections in Fig. 2 are coincident.

The key designated *7a* is opposite the row of tags 12. When the pitch of teeth of the wheel 10 corresponds with the angular spacing between the centres of the keys, one of the keys (the selected key) will take up this position, each time the carriage is stopped by the snapping of click 11. As an alternative, use may be made of a ratchet wheel, of which the angular spacing between the teeth is half the spacing between the centers of the keys. In this case the switching device is constructed in duplicate and the rows of tags are arranged in a manner such that alternatively any one and any other of the rows co-operate with one of the keys. If necessary, the keys are then arranged in two separate drums, the arrangement for actuating the device being accordingly such that each time only the row of tags which is directly opposite a key is actuated.

The selected key may have a notch opposite each tag. The key *7a* has notches opposite the 24th and the 30th tags from the top (Fig. 1) and is "blank" opposite the other tags. Broken lines indicate the points at which the intermediate tags can find a notch in other keys. The key shown in Fig. 1 on the left-hand side of the shaft, has notches opposite the 17th, 19th and 20th tags.

The tags are secured to a lever 14, which is secured to the armature 15 of an electromagnet 16 and which has a pivot 17. When the magnet is energized, the tags move towards the selected key, since the lever 14 turns about the pivot 17 in the right-hand sense. A tag opposite which the edge of the selected key has no notch, abuts against this edge when the magnet 16 is energized. A tag opposite which the selected key is provided with a notch snaps into this notch when the magnet 16 is energized and takes up the position shown in Fig. 3.

Each tag 12 is associated with a switch 18, constituted by a set of contact springs. The six switches of each group of six tags are shown in Fig. 2 to be arranged side by side. Provision is made of five superposed groups of this kind. In Fig. 1 these five groups are indicated by rectangles 19 shown in broken lines. Each group comprises five simple switches and a switch having a change-over contact.

The switches are controlled by a catch 20. The latter has a vane 21, which is engaged by one of the contact springs. In each group of six the vanes are bent to the rear or to the front to such an extent that their ends are aligned.

Each catch is coupled with a hooklike arm 22 of the movable tag 12. This arm has a free stroke *d* (Fig. 2), the length of which is determined by the paths which the tag has to travel from its position of rest to reach the edge of the selected key. Not until the tag enters a notch in the edge of the selected key does the arm 22 engage the catch 20, which is then carried along in the direction of the arrow 13. The switch 18 is thus changed over. This results in the condition shown in Fig. 3.

In the embodiment shown the switching device is simplified by securing the tags 12 to a common armature lever 14, so that not more than one electro-magnet 16 is required. The difficulty arising where upon abutment tags opposite which there is no notch tends to arrest the lever 14 and thus also the other tags can be obviated by making them resilient. In the embodiment given by way of example the tags are pivoted at 23 and are urged by a spring 24. When a tag abuts, its pivot 23 is adapted to shift to the left, the tag turning about this pivot and the spring 24 being stressed more tightly. Finally the tag takes up the position in which it is shown in Fig. 4.

Figure 4:
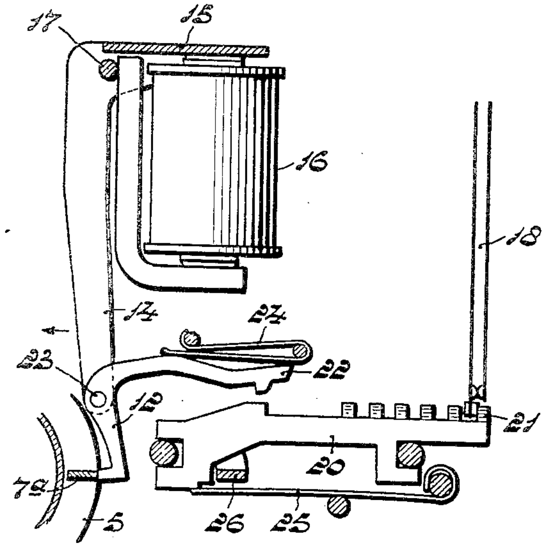

As may furthermore be seen from Fig. 4, the rotation of the tag results in the arm 22 being released from engagement with the catch. The catch thus remains in place in spite of the continued movement of the lever 14.

By modifying the switch device as shown in Fig. 5 its inspection is simplified. With the switch device shown in Fig. 3, the arm 22 is arranged in the direction of movement of the pivot 23, the arms 22 and the springs 24 thus being in a space more or less enclosed between magnet, switch-group, lever and catches. In this case it is not very easy to check the correct operation or to exchange or correct any of the springs 24. In the device shown in Fig. 5 the various parts are more accessible. In this construction it is not the switches associated with the other tags which are changed over.

Figure 3:
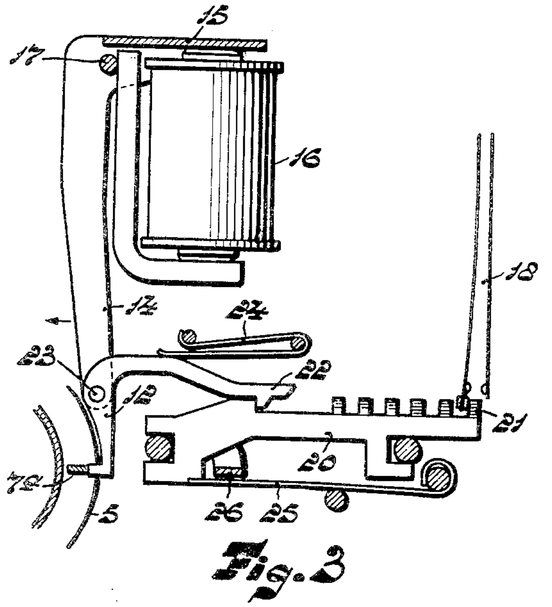
Figs. 3 and 4 show a detail of the device in other positions.

In the embodiment shown in Fig. 5 the arm 22 which transmits the movement of the operation tag 12 to the catch 20 forms a straight unitary piece with the tag itself. The manufacture of a combination of tag and arm arranged so as to form one straight lever which is a form to which the device shown in Fig. 3 is not readily adapted, is more simple and advantageous than that of a hook lever. This is the second reason why in some cases the device shown in Fig. 5 will be preferred. Nevertheless, as an alternative the arm of this device may be set to be at an angle with the tag if this is desirable with a view to ensuring an improved arrangement of the component members.

In the construction shown in Fig. 5 the device according to the invention operates as follows:

On the magnet 16 being energized, it attracts the armature 15, so that the lever 14 is turned about its pivot 17. The tags 12, which are pivotally and resiliently secured to this lever, are moved towards the key drum 5. If, as is shown in the figure, the tag is opposite a notch in the selected key *7a*, the position of the tag relative to the lever remains unchanged and the end of the arm 22 remains clear of the catch 20, the arm 22 being urged by a spring 24, against a stop 27. If, on the contrary, a tag is opposite the area at which the selected key is provided with an elevated part, the tag abuts against the key during the movement of the lever 14 and is turned relatively to the lever 14 about the pivot 23 against the force of the spring 24. The end of the arm 22 thus engages the catch 20 and impels the latter, so that the switch 18 is changed over.

In a direction opposite to the driving force produced by tag 12 the catch is acted upon by the elastic force of the contact springs and, if desired, of an additional and separate spring (not shown). The changed-over switches must remain for some time in the resultant position. For this purpose the magnet 16 might be maintained energized for this time but this is not necessary, since provision is made of a spring-like detent 25, which, upon displacement of the catch, grips behind an upright edge (Fig. 3) or behind the end of the catch (Fig. 5) and prevents the catch being moved back by the aforesaid elastic force, when the energization of the magnet ceased and the tags fall back to their positions of rest. The load on the magnet winding is thus reduced and the carriage enabled to move on without the necessity of first restoring the changed-over switches. Provision is made of an electromagnetically or mechanically controlled detent-lifting device identical with the reference numeral 26 of Figs. 1–4 (not shown) which is common to the thirty catches and adapted to cause all the actuated catches to snap back at the same time.

It is not necessary, as is the case in the embodiments shown, that the tags and catches should be similarly actuated by an electromagnet. The required force may be taken from other members, for example, the driving shaft actuating the carriage.

Switches for automatic telephone systems must fulfill the requirement that it should be possible to stop the carriage within a very short time. It is therefore desirable to minimize the moving mass of such switches. It would appear that the construction of the switching device according to the invention is not favourable in this respect. The drums and keys incorporate a comparatively bulky mass, which might give rise to the occurrence of a heavy shock when the carriage is arrested in its travel by the detent 11.

This disadvantage can be obviated by providing a resilient coupling between the part of the carriage on which the contact brushes are seated and the part supporting the keys. The device which causes the carriage to stop must act upon the first mentioned part, since the latter must substantially not continue to move after braking. However, there is no objection to the second part moving slightly beyond the selected position, since this does not result in the interruption of connections fulfilling a function to stop the carriage. The resilient coupling absorbs the shock and then moves the heavy part of the carriage back into the correct position. By reason of this coupling the device for causing the carriage to stop is not necessarily so strong as otherwise and may be more movable and more readily controlled.

The device shown in Fig. 1 comprises two key drums 5 and 6. Alternatively, provision may be made of more than two drums of this kind each with its associated tag system and system of switches. For various purposes it may be desirable that the device should comprise more than one key drum. Reference has already been made to the case in which in successive operative positions of the carriage two switching devices become operative in succession. Furthermore, the provision of two or more key drums enables a greater number of combinations of switch positions, since all the combinations afforded by one key drum can be combined with each of the combinations afforded by the second drum.

As an alternative, the contact bank may furthermore be divided into a number of sectors equal to the number of key drums, each of these sectors being used for the selection of a digit.

In the latter two cases it is possible to provide the tag systems with a common driving magnet. In this case the keys are provided only in the operative sector of each drum and the other sectors are filled up with strips without recesses or with solid pieces. The drums need not be seated invariably on the same shaft. It may be desirable from the viewpoint of economy of space to secure them to two (or more) inter-geared shafts.

The switching device according to the invention may advantageously be used in telephone systems, in which two sequential impulse series, e. g., obtained by the sequential dialling of two digits, are in combination indicative of part of the nature of the desired connection, e. g., a certain route which the connection to be established has to follow. For incorporation of the device in such a system the positions, in which the carriage may be stopped, are divided into groups each of which is associated with a particular number of impulses in the first of the two sequential impulses. The electrical arrangement is such that the impulses of the first impulse series move the carriage to the beginning of the group associated with the number of the first impulses. The number of impulses in the second series determines the final position of the carriage in the group of positions to which the carriage has been moved by the first impulse series. The movement due to the second impulse series is generally a step-by-step movement, whereas the movement directed by the first impulse series is generally more rapid. The final position of the carriage is thus determined by the two impulse series in combination and the particular key that in that final position is located opposite the tags operating the switching means determines the switch operations which now are carried out by the tags and which control the set-up of the desired connection. It will be seen that for this purpose the operative positions of the carriage may be divided in ten groups of ten positions each. The number of groups as well as the number of positions within a group may vary with the system when in such system not all possible combinations of impulse series will be used.

It may occur that not only the combination of the first two digits, but also of a third digit, which establishes the connection with a next following junction, is to be translated by the device according to the invention, in a manner varying with the preceding combination of digits. By providing a key of the correct profile on the drum the desired manner of translation ran invariably be introduced into the code.

What we claim is:

1. A switching device comprising a carriage movable within a predetermined range of operative positions and having a first portion provided with contact wipers, a contact bank positioned to engage said wipers, said carriage having a second portion provided with a group of exchangeable keys each having a distinct profile, a row of movable tags cooperatively disposed with respect to the second portion of said carriage and having a predetermined rest position, a selected key in said carriage being arranged in each operative position thereof opposite said row of tags, means to displace said tags in said row from their rest position in a direction tending to contact said selected key to an extent depending on the profile of the selected key whereby at least one of said tags in said row is displaced to a different degree than the remaining tags, a switch operatively associated with each tag in said row, and means linking each switch to the associated tag such that upon displacement of said one of said tags only that switch linked to said one of said tags is actuated.

2. A switching device, as set forth in claim 1, wherein said keys are constituted by strip-shaped members affixed to said carriage in a position at which they move at right angles to their plane, the edge of each of said keys adjacent said cooperating tags having at least one notch formed therein to provide said distinct profile.

3. A switching device, as set forth in claim 2, wherein said second carriage portion is provided with a plurality of colinearly arranged drums, a group of keys being mounted on each of said drums, and a row of movable tags being cooperatively disposed with respect to each group of keys.

4. A switching device comprising a carriage movable within a predetermined range of operative positions and having a first portion provided with contact wipers, a contact bank fixedly positioned to engage said wipers upon rotation thereof, said carriage having a second drum-shaped portion provided with a group of exchangeable strip-shaped keys radially mounted on said drums, each key having at least one notch in the free edge thereof to impart a distinct profile thereto, a row of movable tags cooperatively disposed with respect to the second portion of said carriage and having a predetermined rest position, a selected key in said carriage being arranged in each operative position of the range of movement thereof opposite said row of tags, electromagnetic means to displace said tags in said row from their rest position in a direction tending to contact said selected key to an extent depending on the profile of the selected key whereby at least one of said tags of said row is displaced to a greater degree than the remaining tags, an electrical switch operatively associated with each tag, and means mechanically linking each switch to the associated tag such that upon displacement of said one of said tags only that switch linked to said one of said tags is actuated.

5. A device, as set forth in claim 4, wherein said electromagnetic means are constituted by a common driving magnet to displace all of said tags.

6. A device, as set forth in claim 5, wherein said linkage means between each tag and the associated switch includes a shiftable catch member disposed to actuate said switch, and an arm coupled to said tag and engaging said catch with a free stroke such that the catch is engaged only when the related tag enters a notch in the edge of the selected key.

7. A switching device comprising a carriage movable within a predetermined range of operative positions and having a first portion provided with contact wipers, a contact bank fixedly positioned to engage said wipers upon rotation thereof, said carriage having a second drum-shaped portion provided with a group of exchangeable strip-shaped keys radially mounted on said drums, each key having at least one projection in the free edge thereof to impart a distinct profile thereto, a row of movable tags cooperatively disposed with respect to the second portion of said carriage and having a predetermined rest position, a selected key in said carriage being arranged in each operative position of the range of movement thereof opposite said row of tags, electromagnetic means to displace said tags in said row from their rest position in a direction tending to contact said selected key to an extent depending on the profile of the selected key whereby at least one of said tags of said row is displaced to a lesser degree than the remaining tags, an electrical switch operatively associated with each tag, said electromagnetic means being constituted by a common driving magnet, a lever for coupling said magnet to said tags and means pivotally coupling said tags to said lever to effect displacement thereof, and means mechanically linking each switch to the associated tag such that upon displacement of said tags only that switch linked to said one of said tags is actuated, said last-named means including a catch to engage said switch and an alarm integral with the tag and forming a straight piece and disposed to move said catch when said tag is displaced, said lever being provided with a stop and a spring urging said arm against said stop.

8. A switching device, as set forth in claim 6, wherein the arm is hook-like, and wherein when the tag engages an un-notched portion of the free edge of the selected key, said arm is turned away from the associated catch so as to pass this catch without engagement therewith.

9. A device, as set forth in claim 7, wherein the arm and the associated catch are arranged in such manner that the arm in travelling entirely along with the lever remains free from the catch, but is adapted to engage said catch and move it to its operative position when in consequence of the tag being stopped by an un-notched portion of the selected key, the arm is rotated relative to the lever.

10. A device, as claimed in claim 5, wherein said linking means between each tag and the associated switch includes a shiftable catch member disposed to actuate said switch, each catch member having associated therewith spring means for urging the catch member to its unoperative position and resilient latching means being disengageable from the catch member by a lifting device common to the latching means of a plurality of catch members.

References Cited in the file of this patent

UNITED STATES PATENTS

| | | |
|---|---|---|
| 1,462,251 | Slough | July 17, 1923 |
| 2,132,213 | Locke | Oct. 4, 1938 |
| 2,236,297 | Reid | Mar. 25, 1941 |
| 2,318,204 | Deakin | May 4, 1943 |
| 2,523,904 | Hansen | Sept. 26, 1950 |